United States Patent Office 3,575,865
Patented Apr. 20, 1971

3,575,865
BLEACHING COMPOSITIONS
Richard Lerda Burke, Madison, Leo Thomas Murray, East Brunswick, and William Chirash, New Providence, N.J., assignors to Colgate-Palmolive Company, New York, N.Y.
No Drawing. Continuation of application Ser. No. 550,905, May 18, 1966. This application June 12, 1969, Ser. No. 836,213
Int. Cl. C11d 7/56
U.S. Cl. 252—99
10 Claims

ABSTRACT OF THE DISCLOSURE

Abrasive scouring cleanser compositions comprising an inorganic siliceous abrasive, a detergent and a compound capable of liberating hypobromite bromine upon contact with aqueous media.

---

This case is a continuation of Ser. No. 550,905 filed May 18, 1966, now abandoned.

This invention relates to bleaching compositions. More particularly, it relates to bleaching compositions which contain hypobromite oxidizing agents.

The instant compositions exhibit an exceptionally high oxidation and bleaching efficacy on use with aqueous media. The hypobromite oxidizing agents of these compositions are very rapidly soluble and reactive, thus enabling the composition to exhibit improved effectiveness, especially with respect to speed and extent of stain and soil removal. The instant compositions are stable and maintain their high rate of activity under the strongly alkaline conditions desired for many cleaning operations, e.g., at pH 8.5 and higher. They are characterized by highly satisfactory odor characteristics on use.

An abrasive scouring cleanser composition in accordance with the present invention comprises at least about 45% by weight of a water-insoluble inorganic siliceous abrasive material having a particle size (diameter) of less than about 0.5 mm., about 0.1 to 50% by weight of a dry water-soluble compound which, on dissolution in water, liberates hypobromite bromine, and about 0.5 to 15% of a water-soluble organic detergent compound substantially stable in the presence of said hypobromite liberating compound.

Siliceous abrasives suitable for use in such scouring cleanser compositions include materials such as silica, feldspar, pumice, vulcanic ash, diatomaceous earth, bentonite, and talc, and mixtures thereof. For general use, it is preferred to use either silica or feldspar of various degrees of fineness for they are relatively hard and result in a whiter product. The abrasives may vary in hardness, particle size and shape, and the choice for a particular composition is generally dependent upon the contemplated field of application. The particle size of the abrasive is less than 0.5 mm., and, in general, the maximum particle size of substantially all of the abrasive is about 0.15 mm. Normally the abrasive employed will have a particle size such that at least about 85% and preferably 99% by weight thereof passes through a sieve having 0.074 mm. openings. On the other hand, in the interest of effective cleansing action it is appropriate for at least about 8% by weight of the abrasive particles to have a diameter of about 0.037 mm. or larger. The abrasive is present in a proportion of at least about 45%, and preferably at least about 85 to 95%, by weight of the cleanser, and scouring cleansers so formulated are highly effective in polishing tarnished metal surfaces and in removing smears or deposits of soft materials, such as aluminum, from porcelain surfaces.

Hypobromite-liberating compounds suitable for use in the compositions of the present invention are those water-soluble solid compounds which generate hypobromite ion on contact with, or dissolution in, water. These compounds are dry, that is, they are devoid of free water; but they may contain water of crystallization or hydration. Examples thereof are the dry particulate heterocyclic N-bromo imides, such as tribromocyanuric acid, dibromocyanuric acid, and salts thereof, such as sodium dibromocyanurate and potassium dibromocyanurate. Other N-bromo imides may also be used, such as N-bromosuccinimide, N-bromomalonimide, N-bromophthalimide and N-bromonaphthalimide. Additional N-bromo imides are the hydantoins, such as 1,3-dibromo-5,5-dimethylhyantoin; N - monobromo-C,C-dimethylhydantoin; methylene - bis (N - bromo - C,C - dimethylhydantoin); 1,3-dibromo-5-isobutylhydantoin; 1,3-bromo-5-methyl - 5 - ethylhydantoin; 1,3 - dibromo - 5,5 - diisobutylhydantoin; 1,3 - dibromo-5-methyl-5-n-amylhydantoin, and the like. Other useful hypobromite-liberating agents are tribromomelamine and dry, particulate, water soluble anhydrous inorganic salts, such as lithium hypobromite. The hypobromite-liberating agent may, if desired, be a stable, solid complex or hydrate, such as sodium p-toluene-sulfobromamine-trihydrate, sodium benzene-sulfo-bromamine-dihydrate, or calcium hypobromite tetrahydrate. Brominated trisodium phosphate formed by the reaction of sodium hypobromite solution with trisodium phosphate (and water as necessary) may also be used. Also, if desired, compounds which are hypochlorite- as well as hypobromite-yielding may be employed, such as, for example, the N-brominated, N'-chlorinated heterocyclic imides, as for example the N-bromo, N'-chloro-cyanuric acids and salts thereof, e.g., N-monobromo-N, N-dichlorocyanuric acid, N-dibromo-N-monochloro-cyanuric acid, N-monobromo-N-monochlorocyanuric acid, sodium-N - monobromo-N-monochlorocyanurate, potassium-N-monobromo - N - monochlorocyanurate; and the N-brominated, N - chlorinated hydantoins, e.g., N - bromo - N-chloro-5,5-dimethylhydantoin and N-bromo-N-chloro-5-ethyl-5-methyl hydantoin.

The hypobromite-liberating compound is employed in an amount of from 0.1 to 50% by weight of the composition, and preferably in an amount of from about 0.1 to 15% by weight thereof.

The water soluble organic detergent of the instant compositions is one which is stable in the presence of the contemplated hypobromite-liberating component. These organic detergents may be anionic, cationic, amphoteric or nonionic in character, provided that they are compatible with the compositions as a whole in the proportions employed. Where they are liquids under normal conditions, such as the non-ionic agents generally, they may be prepared in particulate solid form after adsorption upon diatomaceous earth or other similar agents in procedures well known in the art.

As examples of suitable anionic detersive compounds contemplated within the ambit of the invention are the soaps and the sulfated and sulfonated synthetic detergents, especially those anionic detergents having about 8 to about 26 and preferably about 12 to about 22 carbon atoms to the molecule. The soaps are generally the water soluble salts of saturated higher fatty acids and mixtures thereof.

The sulfated and sulfonated detersive compounds are also well known in the art and may be prepared from suitable organic materials which are applicable to sulfonation ("true sulfonation and/or sulfation"). Of the vast variety of sulfates and sulfonates suitable, it is preferred to use the aliphatic sulfates and sulfonates of about 8 to 22 carbon atoms and the alkyl aromatic sulfonates.

The alkyl aromatic sulfonate detergents referred to may be mononuclear or polynuclear in structure. More particularly, the aromatic nucleus may be derived from benzene, toluene, xylene, phenol, cresols, phenol, ethers, naphthalene, derivatives of phenanthrene nuclei, etc. It has also been found that the alkyl groups may vary similarly. Thus, for example, the alkyl groups may be straight or branched chain and may consist of such radicals as dodecyl, pentadecyl, octyl, nonyl, decyl, keryl, mixed alkyls derived from fatty materials, cracked paraffin wax, olefins, and polymers of lower mono olefins, etc. While the number of sulfonic acid groups present on the nucleus may vary, it is usual to have only one such group present in order to preserve as much as possible a balanced between hydrophilic and hydrophobic portions of the molecule.

More specific examples of suitable alkyl aromatic sulfonate detergents are the propylated naphthalene sulfonates, the mixed butyl naphthalene sulfonates, tetrahydronaphthalene sulfonates, the various butylated diphenyl sulfonates and phenyl-phenol sulfonates. It is preferred, however, to use the higher alkyl aromatic sulfonates rather than the lower alkyl substituted detergents. Typical examples of this preferred class are the sulfonated and alkylated benzene type compounds wherein the alkyl group is at least 8 and preferably about 10 to about 16 carbon atoms. The benzene ring may possess other substituents including alkyl and hydroxy groups.

Other suitable agents are the surface-active sulfated or sulfonated aliphatic compounds, preferably having 8-22 carbon atoms. Within the scope of such definition are the sulfuric acid esters of polyhydric alcohols incompletely esterified with higher fatty acids, e.g., coconut oil monoglyceride monosulfate, tallow diglyceride monosulfate; the long chain pure or mixed alkyl sulfates, e.g., lauryl sulfate, cetyl sulfate; the hydroxy sulfonated higher fatty acid esters, e.g., higher fatty acid esters of low molecular weight alkylol sulfonic acids, e.g., fatty acid esters of isethionic acid; the fatty acid ethanolamide sulfates; the fatty acid amides of amino alkyl sulfonic acids, e.g., lauric amide of taurine, and the like. More particularly, it is preferred to use the sulfated aliphatic compounds containing at least about 8 carbon atoms, especially those having 12 to about 22 carbon atoms in the molecule.

Although the anionic detergents are preferred, cationic, non-ionic and amphoteric detergents may be also employed in whole or as part of the detergent component, provided they are compatible with the other elements of the composition under conditions of storage and use thereof. As cationic detergents there may be noted the long chain alkyl quaternary ammonium compounds, e.g., cetyl quaternary ammonium salts. Within this group are included cetyl tri-methyl ammonium chloride and cetyl pyridinium chloride. Another equivalent cationic agent is the diethylene amino ethyl oleyl amide product.

The non-ionic agents are also well known in the art including the polyoxyethylene ethers of alkyl aromatic hydroxy bodies (e.g., the akylated polyoxyethylene phenols), the polyoxyethylene ethers of long chain aliphatic alcohols, the polyoxyethylene ethers of hydrophobic propylene oxide polymers, and higher alkyl amine oxides such as lauryl dimethyl amine oxide. Amphoteric detergents which also are contemplated, examples thereof including the salts of higher alkyl beta amino propionic acids, e.g., sodium N-lauryl beta alanine; the higher alkyl substituted betaines such as lauryl dimethylammonium acetic acid; and the imidazoline type exemplified by the disodium salt of 1-(2 hydroxyethyl)-1-carboxymethyl)-2-(hexadecyl)-4,5 dihydro-imidazolinium hydroxide.

The anionic and cationic surface active agents are commonly used in the form of their water soluble salts. For the synthetic anionic compounds, the alkali metal (e.g. sodium, potassium) salts are preferred, though other salts such as ammonium, amine, alkylolamine, and alkaline earth metals (e.g. calcium magnesium) salts may be used if desired. For the cationic agents the chloride, sulfate, acetate, and like salts may be employed satisfactorily.

The amount of organic detergent to be used in the present compositions is from about 0.5% up to about 15% by weight, and preferably from about 1% to about 5%. Commercial detergent compositions in which these organic detergents are the active ingredients and are compounded with other materials including sodium sulfate, the various phosphates, etc. may be employed with satisfactory results.

The instant compositions also suitably contain inorganic water soluble builder salts, such as the alkali metal silicates, nitrates, chlorides, carbonates, bicarbonates, phosphates and borates in suitable amounts, usually up to about 25% and preferably up to about 15% by weight. The alkaline water soluble buffer salts are preferred builders; examples of such builders including sodium carbonate, sodium bicarbonate, sodium metasilicate, trisodium phosphate, tetrasodium pyrophosphate, sodium tripolyphosphate, and the corresponding potassium salts. These buffer salts preferably are employed in amounts within the range specified such that the final product exhibits a pH in water of from about 8.5-13. There may also be present minor amounts, e.g., 0.01-5% by weight, of sesquestering agents such as nitrilotriacetic acid, ethylene diaminetetraacetic acid, wood pulp, sawdust, magnesite, whiting, sodium carboxymethylcellulose, anti-caking agents, optical brighteners, and the like.

In the preparation of scouring cleansers in accordance with the present invention it is desirable that all constituents be of the same fine particle size as the abrasive constituent, and suitably they may be ground in an attrition mill if necessary in order to insure the preparation of a uniform product of smooth appearance.

The following examples are illustrative of the present invention, and it will be understood that the invention is not limited thereto. All of the solid constituents employed in the compositions of these examples have a maximum particle diameter of less than 0.5 mm., and at least 8% by weight of the abrasive, e.g., silica and feldspar, particles have a diameter in the range of 0.037–0.15 mm. In these examples, and elsewhere throughout the specification and claims, all proportions and ratios are by weight unless otherwise specified.

EXAMPLE I

A solution of 30 parts by weight of sodium hydroxide and 100 parts by weight of water is chilled to a temperature of about 0° C. Forty parts by weight of bromine is added thereto slowly with mixing adequate to insure that the pH of the system continually is above 13. The temperature of the reaction mixture is maintained between 0° C. and —10° C. The final solution contains about 17.5% sodium hypobromite by analysis, and 15.1% sodium bromide, 5.9% sodium hydroxide and 61.5% water by calculation.

72.8 parts by weight of anhydrous trisodium orthophosphate are added slowly to 25 parts by weight of the foregoing sodium hypobromite solution diluted with 72.4 parts by weight of water. The addition is carried out at a temperature below 20° C. A solid product is formed which contains approximately 1.28% sodium hypobromite (by analysis) in the form of brominated trisodium phosphate.

An abrasive scouring cleanser is prepared by mixing intimately the following dry constituents:

| | Parts by Wt. |
|---|---|
| Silica (at least 99% by weight passes through a wire sieve in which the openings between the wires are 0.074 mm.) | 48.3 |
| Brominated trisodium phosphate (prepared as above) | 42.0 |
| Sodium dodecyl benzene sulfonate | 3.0 |
| Sodium sulfate | 6.7 |

EXAMPLE II

| | |
|---|---|
| Silica (at least 99% by weight passes through a wire sieve in which the openings between the wires are 0.074 mm.) | 89.8 |
| Tribromocyanuric acid | 0.2 |
| Sodium dodecylbenzene sulfonate | 4.0 |
| Sodium sulfate | 2.3 |
| Sodium silicate | 0.7 |
| Trisodium phosphate | 3.0 |

EXAMPLE III

| | |
|---|---|
| Silica of Example I | 92.2 |
| Sodium dodecylbenzene sulfonate | 4.0 |
| Sodium sulfate | 2.3 |
| Sodium silicate | 0.7 |
| Potassium monobromo monochlorocyanurate | 0.8 |

EXAMPLE IV

| | |
|---|---|
| Silica of Example I | 80.0 |
| Sodium dodecylbenzene sulfonate | 3.5 |
| Sodium sulfate | 3.1 |
| Pentasodium tripolyphosphate | 5.5 |
| Sodium silicate | 1.5 |
| N-monobromo-N-monochloro - 5,5 - dimethyl hydantoin | 6.4 |

EXAMPLE V

| | |
|---|---|
| Feldspar (at least 99% by weight passes through a wire sieve in which the openings between the wires are 0.074 mm.) | 90.7 |
| Trisodium phosphate | 0.4 |
| Sodium chloride | 0.1 |
| Sodium carbonate | 0.6 |
| Sodium soap (mixed tallow and coconut oil soaps in 50–50 proportion) | 3.2 |
| N-bromo-succinimide | 5.0 |

EXAMPLE VI

| | |
|---|---|
| Silica of Example I | 88.92 |
| Sodium lauryl sulfate | 3.55 |
| Sodium sulfate | 2.2 |
| Pentasodium tripolyphosphate | 3.7 |
| Sodium silicate | 1.1 |
| Dibromocyanuric acid | 0.25 |
| Melamine | 0.20 |
| Perfume | 0.08 |

In this example the dibromocyanuric acid may be replaced by an equal weight of potassium dibromocyanurate.

EXAMPLE VII

| | |
|---|---|
| Silica of Example I | 89.12 |
| Trisodium phosphate | 3.95 |
| Tribromocyanuric acid | 0.91 |
| Sodium dodecylbenzene sulfonate | 3.00 |
| Sodium sulfate | 2.45 |
| Perfume | 0.25 |
| Inert colored pigments | 0.25 |

This scouring cleanser exhibits a pH of 11.3 in 50% aqueous slurry.

EXAMPLE VIII

A slurry of 4 parts by weight of calcium hydroxide and 50 parts by weight of water is chilled to a temperature of about 0° C. 20 parts by weight of bromine are added thereto slowly with rapid stirring while the temperature is maintained near 0° C. The reaction mixture is filtered and a bright yellow solid is recovered. The solid is dried and analyzed. It is found to contain 22.9% calcium hypobromite and 1.82% calcium bromate (by analysis), the remaining solids consisting principally of calcium hydroxide and some calcium bromide.

An abrasive scouring cleanser is prepared by mixing intimately the following dry constituents:

| | Parts by wt. |
|---|---|
| Silica of Example I | 87.05 |
| Calcium hypobromite (22.9% assay—prepared as above) | 3.50 |
| Sodium dodecylbenzene sulfonate | 3.00 |
| Sodium sulfate | 2.45 |
| Trisodium phosphate | 4.00 |

What is claimed is:

1. An abrasive scouring cleanser composition consisting essentially of at least about 45% by weight of a water-insoluble inorganic siliceous abrasive material having a particle size of less than about 0.5 mm., about 0.1 to 50% by weight of a dry water-soluble compound which, on dissolution in water, liberates hypobromite bromine, and about 0.5 to 15% by weight of a water-soluble organic detergent compound substantially stable in the presence of said hypobromite liberating compound.

2. An abrasive scouring cleanser as set forth in claim 1 which has a pH in water of at least 11.

3. An abrasive scouring cleanser composition as set forth in claim 1 which contains brominated trisodium phosphate.

4. An abrasive scouring cleanser composition as set forth in claim 1 which contains brominated cyanuric acid.

5. An abrasive scouring cleanser as set forth in claim 1 wherein said siliceous abrasive material is present in amounts of at least about 85% by weight, said dry water-soluble compound is a heterocyclic N-bromo imide and is present in amounts of about 0.1 to about 15% by weight, and said detergent is an anionic detergent compound.

6. An abrasive scouring cleanser composition according to claim 1 wherein said dry water-soluble compound is tribromocyanuric acid.

7. An abrasive, scouring, cleansing composition according to claim 1 further containing up to 25% by weight of water soluble builder salt.

8. An abrasive, scouring, cleansing composition according to claim 5 further containing up to 25% by weight of water soluble builder salt.

9. An abrasive scouring cleanser composition according to claim 7 wherein said builder salt is trisodium phosphate.

10. An abrasive scouring cleanser composition according to claim 8 wherein said builder salt is trisodium phosphate.

References Cited

UNITED STATES PATENTS

| 3,083,072 | 3/1963 | Leclerc. |
|---|---|---|
| 3,147,219 | 9/1964 | Paterson. |

FOREIGN PATENTS

| 208,587 | 6/1957 | Australia. |
|---|---|---|

MAYER WEINBLATT, Primary Examiner

U.S. Cl. X.R.

252—95, 103, 187; 8—108